United States Patent
Davidsson et al.

(10) Patent No.: US 9,758,174 B2
(45) Date of Patent: Sep. 12, 2017

(54) METHOD AND SYSTEM FOR AVOIDING DISTRACTING A VEHICLE OCCUPANT

(71) Applicant: VOLVO CAR CORPORATION, Gothenburg (SE)

(72) Inventors: Staffan Davidsson, Vastra Frolunda (SE); Johan Maresch, Gothenburg (SE)

(73) Assignee: VOLVO CAR CORPORATION (SE)

( * ) Notice: Subject to any disclaimer, the term of this patent is extended or adjusted under 35 U.S.C. 154(b) by 33 days.

(21) Appl. No.: 14/861,205

(22) Filed: Sep. 22, 2015

(65) Prior Publication Data

US 2016/0096528 A1    Apr. 7, 2016

(30) Foreign Application Priority Data

Oct. 3, 2014   (EP) ..................................... 14187626

(51) Int. Cl.
*G06F 7/00*     (2006.01)
*B60W 40/08*    (2012.01)
(Continued)

(52) U.S. Cl.
CPC ......... *B60W 40/08* (2013.01); *G01C 21/3697* (2013.01); *H04W 4/02* (2013.01);
(Continued)

(58) Field of Classification Search
CPC .............. B60W 40/08; B60W 2710/30; G01C 21/3697; G01C 21/3641; H04W 4/02; G06Q 30/0241
(Continued)

(56) References Cited

U.S. PATENT DOCUMENTS 6,526,335 B1 *   2/2003   Treyz ..................... G01C 21/26
                                                             307/10.1
7,216,022 B2     5/2007   Kynast et al.
(Continued)

FOREIGN PATENT DOCUMENTS

EP    0985906 A1    3/2000
EP    2299355 A2    3/2011
EP    1519851 B1    8/2012

OTHER PUBLICATIONS

Extended European Search Report Dated Apr. 28, 2015, Application No. 14187626.8-1557, Applicant Volvo Car 6 Pages.
(Continued)

*Primary Examiner* — Jaime Figueroa
(74) *Attorney, Agent, or Firm* — Brooks Kushman P.C.

(57) ABSTRACT

A method performed by an information suppressing system for avoiding distracting an occupant of a vehicle with superfluous information via a medium associated with the vehicle is provided. The medium is adapted to present at least a first piece of information associated with at least a first entity located in a current vicinity of the vehicle. The system determines status data comprising one or more status data parameters reflecting current conditions, and further determines the at least first piece of information to be currently superfluous, based on comparing at least a first status data parameter of the status data with predetermined suppression criteria. Moreover, the system suppresses the at least first piece of information, wherein at least a portion of the at least first piece of information is prevented from being presented via the medium. An information suppressing system in accordance with the foregoing is also provided.

20 Claims, 4 Drawing Sheets

(51) Int. Cl.
 *H04W 4/02* (2009.01)
 *G01C 21/36* (2006.01)
 *G06Q 30/02* (2012.01)

(52) U.S. Cl.
 CPC ..... *B60W 2710/30* (2013.01); *G01C 21/3641* (2013.01); *G06Q 30/0241* (2013.01)

(58) Field of Classification Search
 USPC ........................................................ 701/1, 36
 See application file for complete search history.

(56) References Cited

U.S. PATENT DOCUMENTS

| | | | | |
|---|---|---|---|---|
| 9,172,477 | B2* | 10/2015 | Lawrence | H04B 17/27 |
| 2005/0159853 | A1* | 7/2005 | Takahashi | B60W 40/08 |
| | | | | 701/1 |
| 2009/0091432 | A1* | 4/2009 | Koser | G01C 21/3652 |
| | | | | 340/425.5 |
| 2009/0306886 | A1 | 12/2009 | Mueller | |
| 2009/0309787 | A1* | 12/2009 | Gildea | G01C 21/3641 |
| | | | | 342/357.31 |
| 2010/0292886 | A1 | 11/2010 | Szczerba et al. | |
| 2011/0021234 | A1* | 1/2011 | Tibbitts | H04W 48/04 |
| | | | | 455/517 |
| 2013/0275224 | A1* | 10/2013 | Prakah-Asante | G06Q 30/0241 |
| | | | | 705/14.63 |
| 2014/0114575 | A1* | 4/2014 | Alders | G01C 21/3655 |
| | | | | 701/538 |
| 2014/0249717 | A1* | 9/2014 | Takahashi | B60R 21/00 |
| | | | | 701/36 |
| 2014/0358438 | A1* | 12/2014 | Cerny | G01C 21/00 |
| | | | | 701/537 |
| 2015/0360696 | A1* | 12/2015 | Yi | B60W 40/08 |
| | | | | 340/576 |
| 2016/0101784 | A1* | 4/2016 | Olson | B60W 40/08 |
| | | | | 340/576 |
| 2016/0205238 | A1* | 7/2016 | Abramson | G01C 21/3484 |
| | | | | 455/456.4 |

OTHER PUBLICATIONS

European Communication Dated Jul. 18, 2017, Application No. 14 187 626.8-1557, Applicant Volvo Car Corporation, 4 pages.

* cited by examiner

METHOD AND SYSTEM FOR AVOIDING DISTRACTING A VEHICLE OCCUPANT

CROSS-REFERENCE TO RELATED APPLICATIONS

This application claims foreign priority benefits under 35 U.S.C. §119(a)-(d) to European patent application number EP 14187626.8, filed Oct. 3, 2014, which is incorporated by reference in its entirety.

TECHNICAL FIELD

The present disclosure relates to an information suppressing system and a method performed therein for avoiding distracting an occupant of a vehicle with superfluous information.

BACKGROUND

While driving, a driver of a vehicle is likely to be subjected to a large amount of information. For each year, the amount of information seems to increase, as information of different sorts becomes more easily accessible and may be more easily presented. The information referred to may for instance relate to vehicle information presented on a display of e.g., an instrument panel or center stack of the vehicle, or presented via loud speakers thereof. Furthermore, the increased amount of information may be the result of an increased amount of functionality being implemented into in-vehicle systems, such as infotainment systems.

Moreover, the use of mobile user devices such as smart phones has increased rapidly in the last few years. Not surprisingly, extending applications from the mobile user device to the vehicle has become a popular feature offered by various service providers and vehicle manufacturers. A mobile user device connected to a vehicle, for instance via a USB connection and/or a wireless connection, is commonly referred to as a nomadic device, and includes all types of information and communication as well as entertainment devices that can be brought into the vehicle by the driver to be used while driving. Current examples of nomadic devices include e.g., mobile phones, portable computers, Pocket PCs, PDAs, mobile navigation devices, iPods, and multi-functional smart phones. Bringing the mobile user device into the vehicle commonly results in that an even greater amount of information may be available to the vehicle driver.

The excessive amount of available information may imply a risk of the vehicle driver being distracted, i.e., that attention is taken from driving, a situation which needs to be addressed.

EP 1 519 851, for instance, relates to a method for operating information systems for providing information to a driver of a motor vehicle, via which method increased driving safety may be obtained. It is suggested that the information to be output to the driver is selected as a function of vehicle operating data. However, although the described approach provides a solution according to which the driver is not unnecessarily distracted from the main task of driving the vehicle, EP 1 519 851 merely suggests that the driver is provided with selected information adapted to a particular driving situation.

SUMMARY

It is therefore an object of embodiments herein to provide an approach supporting avoidance of distracting an occupant of a vehicle with superfluous information.

According to a first aspect of embodiments herein, the object is achieved by a method performed by an information suppressing system for avoiding distracting an occupant of a vehicle with superfluous information via a medium associated with the vehicle. The medium is adapted to present at least a first piece of information associated with at least a first entity located in a current vicinity of the vehicle. The information suppressing system determines status data, which status data comprises one or more status data parameters reflecting current conditions. The information suppressing system further determines the at least first piece of information to be currently superfluous, based on comparing at least a first status data parameter of the status data with predetermined suppression criteria. Moreover, the information suppression system suppresses the at least first piece of information, wherein at least a portion of the at least first piece of information is prevented from being presented via the medium.

Thereby, should the introduced information suppression system establish that information related to a nearby entity is currently superfluous, then that information is discarded, such that said information does not unnecessarily distract a vehicle occupant, e.g., the vehicle driver.

An advantage with embodiments herein may be that merely information considered relevant at a prevailing moment is presented to the e.g., driver.

Yet another advantage with embodiments herein may be that should it be determined that the at least first piece of information, for instance an advertising offer, is to be suppressed, the information suppression system may cancel the at least first piece of information from being presented on the e.g., display, and/or remove the at least first piece of information from the e.g., display.

For that reason, an approach is provided supporting avoidance of distracting an occupant of a vehicle with superfluous information.

The technical features and corresponding advantages of the above mentioned method will be discussed in further detail in the following.

By introducing a method performed by an information suppressing system for avoiding distracting an occupant of a vehicle with superfluous information via a medium associated with the vehicle, an approach is provided which enables the vehicle occupant to, rather than being subjected to a vast amount of information which may be of less significance, devote his or her attention to other more important activities, such as driving. The word "vehicle" may refer to any arbitrary vehicle, and may for instance refer to an engine-propelled vehicle, such as car, truck, lorry, van, bus, motor cycle, scooter, tractor, military vehicle, vessel, boat, etc., a rail-bound vehicle, such as e.g., a train or tram, or a bicycle. Furthermore, the expression "vehicle occupant" may refer to any arbitrary occupant of the vehicle, such as a driver thereof. The expression "superfluous information" may refer to content to which the vehicle occupant is subjected, which content is considered to be of no interest to him or her. The word "medium" is throughout this disclosure intended to refer to presentation means, such as, for instance, one or more of a display, head-up display projected on a windscreen of the vehicle, loudspeaker, and/or headset etc. Moreover, the medium being "associated with" the vehicle may refer to the medium being "related to" the vehicle, such as, for instance, being comprised in or integrated with the vehicle, or being physically or wirelessly connected to the vehicle. The medium may hence be represented by e.g., a display, loudspeaker and/or headset of an in-vehicle system of the vehicle, or by e.g., a display, loudspeaker and/or headset of e.g., a smartphone on-board the vehicle.

Since the medium is adapted to present at least a first piece of information associated with at least a first entity located in a current vicinity of the vehicle, the medium, i.e., the presentation means, is configured for presenting content related to an entity located relatively close to the vehicle. Accordingly, the medium is adapted to present information related to entities within vicinity of the vehicle, hence local-based information. The first piece of information may be pre-loaded to the information suppressing system, and/or the information suppressing system may have online abilities, by means of which the first piece of information may be provided to the information suppressing system. The information suppressing system may be provided with the online abilities by means of the vehicle, a nomadic device paired with the vehicle, and/or a mobile user device such as e.g., a smartphone on-board the vehicle, being adapted to be in radio communication with a radio communications network, such as cellular communications network, e.g., LTE, EDGE, CDMA, 4G, 3G, GPRS, or GSM.

"Mobile user device" may refer to, for instance, a mobile terminal or wireless terminal, a mobile phone, a computer such as e.g., a laptop, a Personal Digital Assistant (PDA) or tablet computer, sometimes referred to as a surf plate, with wireless capability, or for example, a portable, pocket-storable, hand-held, computer-comprised mobile device. Furthermore, "nomadic device" may refer to the mobile user device when being paired with the vehicle. The nomadic device being "paired" with e.g., an in-vehicle system of the vehicle refers to the nomadic device being connected to the vehicle. Such a connection may for instance be accomplished physically, such as via USB connection, and/or wirelessly, such as via Bluetooth, WiFi, or the like. Additionally or alternatively, the connection may be accomplished via an intermediate system adapted to communicate with vehicles, for instance a management and/or assisting system such as e.g., Volvo On Call. Possibly, in order to be paired, identification of the nomadic device may be necessary, and/or authentication of the vehicle occupant. While the nomadic device is paired, the vehicle occupant may utilize functionality of the nomadic device via the in-vehicle system. That is, the nomadic device may include various user application programs, e.g., either integrated into an operating system of the nomadic device, and/or stored in a memory thereof and executable by a processor thereof. Thus, user application programs may be hosted and run on the nomadic device while the vehicle occupant may interact with one or several of the user application programs through the in-vehicle system. Moreover, while the nomadic device is paired, the resources of the in-vehicle system may be utilized, such as e.g., microphones, speakers, displays and/or in-vehicle buttons for interacting with a selected user application program running on the nomadic device.

The word "entity" may refer to, for instance, a business or municipal operation or organization, providing products or services. Examples include restaurants, stores, hotels, fuel stations, service stations or the like. The expression "first piece of information associated with at least a first entity" may refer to any arbitrary content related to the first entity. One example is an offer or deal offered by the first entity, e.g., a discounted meal should the first entity be represented by a restaurant. Another example is the first piece of information comprising advertising information for the first entity, and yet another example the first piece of information comprising curiosa related to the first entity. The expression "the medium being adapted to present the at least first piece of information" may refer to the medium being configured to visually display, e.g., by means of a pop-up message, and/or audibly announce, e.g., by means of an acoustic message, the at least first piece of information, e.g., the previously discussed meal offer. Visual, audible and even haptic presentation by the medium of the first piece of information may be combined in any arbitrary manner suitable for the implementation at hand. In the scenario of visual presentation, the "first piece of information" may, for instance, comprise one or a combination of letters, numbers, symbols, graphics, video, digital images, and/or animations.

The expression "first entity located in a current vicinity of the vehicle" may refer to the first entity, at an essentially current point of time, being judged to be in relative closeness to the vehicle. "In vicinity of the vehicle" is throughout this disclosure intended to be interpreted in a broad manner, likewise including e.g., "close to the vehicle", "nearby the vehicle", "within a relatively short distance from the vehicle" and/or "in the same region as the vehicle". The first entity may be within a predetermined or selected distance, for instance be within a maximum distance of 100, 1,000, or 10,000 meters from the vehicle. Additionally or alternatively, the first entity may be within a predefined arbitrarily sized and/or shaped region, which region overlaps the position of the vehicle. Since the vehicle may be moving, what is considered to constitute the "current vicinity", may change.

Since the information suppressing system determines status data, which status data comprises one or more status data parameters reflecting current conditions, the information suppressing system establishes a current status pertinent a prevailing situation. The status data of a first information suppressing system at a specific position at a specific time, may differ from the corresponding status data of a second information suppressing system at that same specific position at that same specific time. The expression "status data parameters reflecting current conditions" may refer to status data elements revealing, indicating and/or comprising prevailing status values of parameters, associated with, for instance, the vehicle. "Current conditions" is throughout this disclosure intended to be interpreted as "essentially current conditions", thus likewise including e.g., "recently prevailing conditions". The expression of the information suppressing system "determining" status data may refer to the information suppressing system "establishing", "learning of", "receiving", "retrieving", "reading" and/or "fetching" status data. For instance, the one or more status data parameters may already be known by concurrent systems of the vehicle, and may thus be available to the information suppressing system. Moreover, determining of status data may take place periodically, essentially constantly and/or on request.

Since the information suppressing system further determines the at least first piece of information to be currently superfluous, based on comparing at least a first status data parameter of the status data with predetermined suppression criteria, the information suppressing system establishes whether the first piece of information is considered to, at a prevailing point of time, be of interest to the vehicle occupant, or may be discarded as uninteresting. That is, by comparing at least a first status data parameter of the status data, e.g., a parameter reflecting a current vehicle fuel level, with predetermined suppression criteria, e.g., a fuel level threshold preference, the information suppressing system may determine that if the current vehicle fuel level is above the fuel level threshold, the first piece of information, e.g., a fuel discount offer from the first entity, e.g., a fuel station, is considered currently superfluous since the vehicle at the prevailing moment is assumed to be of no need of refueling. The expression "currently superfluous" is throughout this disclosure intended to be interpreted as "essentially currently superfluous", thus likewise including e.g., "recently superfluous" should the status data hold parameter values not being determined in real-time. Furthermore, the predetermined suppression criteria, which may be adjustable, may be set to values considered appropriate for the situation at hand.

According to one example, the status data may comprise one or more status data parameters reflecting a current travel direction, thus indicating whether the vehicle is moving toward or away from the first entity, e.g., a restaurant. Correspondingly, the predetermined suppression criteria may comprise one or more suppression parameters reflecting a travel direction preference. Accordingly, by comparing the one or more status data parameters reflecting the current travel direction of the vehicle, with the one or more suppression parameters reflecting the travel direction preference, the information suppressing system may determine that if the vehicle is moving away from the first entity, i.e., the exemplifying restaurant, the first piece of information, such as a meal discount offer and/or advertising information associated with said restaurant, is considered currently superfluous since the vehicle and hence the vehicle occupant at the prevailing moment is assumed or known to be travelling away from, rather than toward, said restaurant.

According to another example, the status data may comprise one or more status data parameters reflecting current timing conditions. That is, the status data may comprise one or more status data parameters reflecting, for instance, a current point of time. Correspondingly, the predetermined suppression criteria may comprise one or more suppression parameters reflecting a time interval preference. Accordingly, by comparing the one or more status data parameters reflecting the current point of time, with the one or more suppression parameters reflecting the time interval preference, the information suppressing system may determine that if the current point of time lies within the range of the time interval preference, e.g., in the range of 11:00-14:00 hrs., the first piece of information, such as a meal discount offer and/or advertising information associated with the first entity, e.g., a restaurant, is considered currently superfluous since it is assumed or known that said restaurant may draw a crowd during lunch hours without offering meal discounts and/or advertising.

According to yet another example related to the status data comprising one or more status data parameters reflecting current timing conditions, the status data may comprise one or more status data parameters reflecting, for instance, a current day of the week. Correspondingly, the predetermined suppression criteria may comprise one or more suppression parameters reflecting a day of the week preference. Accordingly, by comparing the one or more status data parameters reflecting the current day of the week, with the one or more suppression parameters reflecting the day of the week preference, the information suppressing system may determine that if the current day of the week coincides with a day specified by the day of the week preference, e.g., a Sunday, the first piece of information, such as a meal discount offer and/or advertising information associated with the first entity, e.g., a restaurant, is considered currently superfluous since it is assumed or known that said restaurant is closed during that day of the week.

According to still another example related to the status data comprising one or more status data parameters reflect-ing current timing conditions, the status data may comprise one or more status data parameters reflecting, for instance, a current time of vehicle journey. Correspondingly, the predetermined suppression criteria may comprise one or more suppression parameters reflecting a time of journey threshold preference. Accordingly, by comparing the one or more status data parameters reflecting the current time of vehicle journey, e.g., for how long the vehicle has been travelling since a journey started, with the one or more parameters reflecting the time of journey threshold preference, the information suppressing system may determine that if the current time a journey for the vehicle is below the threshold, for instance set to 10-60 minutes, the first piece of information, such as a meal discount offer and/or advertising information associated with the first entity, e.g., a restaurant, is considered currently superfluous since it is assumed that the vehicle occupant is uninterested in stopping at a restaurant so shortly after starting his or her vehicle journey.

According to yet another example related to the status data comprising one or more status data parameters reflecting current timing conditions, the status data may comprise one or more status data parameters reflecting, for instance, a current time of vehicle presence in a predefined region. Correspondingly, the predetermined suppression criteria may comprise one or more suppression parameters reflecting a preference threshold for a time of vehicle presence in the predefined region. Accordingly, by comparing the one or more status data parameters reflecting the current time of vehicle presence in a predefined region, e.g., for how long the vehicle has been within a predetermined area, with the one or more parameters reflecting the preference threshold for the time of vehicle presence in the predefined region, the information suppressing system may determine that if the current time of vehicle presence in the predefined region is above the threshold, for instance set to 1-10 minutes, the first piece of information, such as a meal discount offer and/or advertising information associated with the first entity, e.g., a restaurant, is considered currently superfluous since it is assumed that the vehicle occupant has been subjected to said first piece of information long enough.

According to one example, the predetermined suppression criteria may comprise one or more suppression parameters reflecting suppressing settings associated with the information suppressing system. The suppressing settings may be set by a user of the information suppressing system, such as by the vehicle occupant, to apply a personalized information suppressing filter. The suppressing settings may, for instance, specify preferred type of food or restaurant, preferred type of fuel, and/or preferred type of store, whereby information from nearby entities not in line with the preferences may be determined to be superfluous based on said suppressing settings.

Moreover, the vehicle occupant may select how information should be presented, for instance visually or orally, and/or on which device(s), screen(s) and/or loudspeaker(s) in the vehicle. The information suppressing system may accordingly comprise an input unit via which a vehicle occupant may provide his or her preferences as to which information is to be suppressed and/or how information is to be presented. The vehicle occupant may provide input via, for instance, a touch screen, spoken commands, and/or buttons or knobs.

Furthermore, the information suppressing system may store information, such as the at least first piece of information, so that a vehicle occupant may look through information of interest to him or her at a later point in time. The vehicle occupant may, for instance, select to store a particular type of information, such as fuel price advertisements, to review after a journey, in order to plan a re-fueling stop on his or her return journey.

Since the information suppression system suppresses the at least first piece of information, wherein at least a portion of the at least first piece of information is prevented from being presented via the medium, the information suppression system discards information considered currently superfluous, such that said information does not unnecessarily distract the occupant of the vehicle. That is, should it be determined that the at least first piece of information, for instance an advertising offer, is to be suppressed, the information suppression system may cancel the at least first piece of information from being presented on the e.g., display, and/or remove the at least first piece of information from the e.g., display. "Suppressing" may likewise include "filtering out" and/or "discarding", whereas the expression "at least a portion of the at least first piece of information" may range from merely a fraction of the content of the at least first piece of information, to the more preferred entire content of the at least first piece of information. "Prevented" may likewise include "cancelled" and/or "removed", in that the at least first piece of information may already have been presented via the medium when it is determined that the at least first piece of information should be suppressed.

According to an embodiment, the status data may comprise one or more status data parameters reflecting current status conditions associated with the vehicle. Thereby, conditions related to the vehicle at an essentially prevailing point of time, are taken into consideration.

According to one example related to the status data comprising one or more status data parameters reflecting current status conditions associated with the vehicle, the status data may comprise one or more status data parameters reflecting a current vehicle fuel level. Correspondingly, the predetermined suppression criteria may comprise one or more suppression parameters reflecting a vehicle fuel level threshold preference. Accordingly, by comparing the one or more status data parameters reflecting the current vehicle fuel level, with the one or more suppression parameters reflecting the vehicle fuel level threshold preference, the information suppressing system may determine that if the vehicle fuel level is above said threshold, the first piece of information, such as fuel station advertising information associated with the first entity, e.g., a fuel station, is considered currently superfluous since it is assumed that the vehicle is not in need of refueling.

According to another example related to the status data comprising one or more status data parameters reflecting current status conditions associated with the vehicle, the status data may comprise one or more status data parameters reflecting a current washer fluid level. Correspondingly, the predetermined suppression criteria may comprise one or more suppression parameters reflecting a washer fluid threshold preference. Accordingly, by comparing the one or more status data parameters reflecting the current washer fluid level, with the one or more suppression parameters reflecting the washer fluid threshold preference, the information suppressing system may determine that if the vehicle washer fluid level is above said threshold, the first piece of information, such as fuel station advertising information associated with the first entity, e.g., a fuel station, is considered currently superfluous since it is assumed that the vehicle is not in need of refilling washer fluid.

According to yet another example related to the status data comprising one or more status data parameters reflecting current status conditions associated with the vehicle, the status data may comprise one or more status data parameters reflecting a current vehicle information status of said vehicle, for instance a current driver alert status. Correspondingly, the predetermined suppression criteria may comprise one or more suppression parameters reflecting preferences of vehicle information status, for instance a driver alert status preference. Accordingly, by comparing the one or more status data parameters reflecting the current driver alert status, with the one or more suppression parameters reflecting the driver alert status preference, the information suppressing system may determine that if a level of the driver alert status is below a threshold of the driver alert status preference, the first piece of information, such as a discount offer associated with the first entity, e.g., a coffee shop, is considered currently superfluous, since there is no indication of the driver being potentially drowsy or inattentive.

According to still another example related to the status data comprising one or more status data parameters reflecting current status conditions associated with the vehicle, the status data may comprise one or more status data parameters reflecting a current vehicle information status of said vehicle, for instance a current number of vehicle occupants. Correspondingly, the predetermined suppression criteria may comprise one or more suppression parameters reflecting preferences of vehicle information status, for instance a preference for number of vehicle occupants. Accordingly, by comparing the one or more status data parameters reflecting the current number of vehicle occupants, with the one or more suppression parameters reflecting the preference for number of vehicle occupants, the information suppressing system may determine that if the number of vehicle occupants for instance is below a number specified by the preference for number of vehicle occupants, e.g., 2, the first piece of information, such as a "2 cups of coffee for the price of 1" offer associated with the first entity, e.g., a coffee shop, is considered currently superfluous, since the current number of passengers does not add up to 2.

According to another embodiment, the first piece of information may comprise a current commercial offer associated with the first entity. Thereby, the first piece of information may, as indicated in the foregoing, comprise for instance a discount offer currently applicable at the first entity, for instance a store, restaurant or service provider.

According to a further embodiment, the status data may comprise one or more status data parameters reflecting a prior utilization by the information suppressing system, of a prior commercial offer associated with the first entity and/or a second entity associated with the first entity. Thereby, the information suppressing system may take into account whether a previous commercial offer, which may be similar to a current commercial offer, has been used. Utilization of a prior offer may be acknowledged by any arbitrary known means, for instance by the previous entity, i.e., the first or second entity, confirming electronically that the prior offer has been utilized by the information suppressing system. The expression "prior utilization" may include "previous utilization" and/or "utilization further back", whereas "prior commercial offer" may include "previous commercial offer" and/or "concurrent commercial offer". Furthermore, "offer" may include "deal" and/or "discount", whereas the expression "associated with the first entity and/or a second entity" may include "related to the first entity and/or second entity". Moreover, the expression "second entity associated with the first entity" may include "second entity related to the first entity", "second entity similar to the first entity", "second entity under the same brand as the first entity" and/or "second entity offering similar services and/or products as the first entity".

According to an example related to the foregoing, the status data may comprise one or more status data parameters reflecting a prior utilization by the information suppressing system, of a prior commercial offer associated with the first entity, and correspondingly, the predetermined suppression criteria may comprise one or more suppression parameters reflecting preferences of a prior utilization of the prior commercial offer associated with the first entity. Accordingly, by comparing the one or more status data parameters reflecting the prior utilization of the prior commercial offer, with the preferences of the prior utilization, the information suppressing system may determine that if the prior commercial offer, e.g., a meal discount offer associated with the first entity, e.g., a restaurant, has been utilized recently within a time specified by the preferences of the prior utilization, e.g., 2 hours, the first piece of information, e.g., yet another meal offer associated with the first entity, i.e., said restaurant, is considered currently superfluous, since it is assumed that the vehicle occupant is not interested in eating again within such a short period of time.

According to yet another example related to the foregoing, the status data may comprise one or more status data parameters reflecting a prior utilization by the information suppressing system, of a prior commercial offer associated with a second entity associated with the first entity, and correspondingly, the predetermined suppression criteria may comprise one or more suppression parameters reflecting preferences of a prior utilization of a prior commercial offer associated with a second entity associated with the first entity. Accordingly, by comparing the one or more status data parameters reflecting the prior utilization of the prior commercial offer, with the preferences of the prior utilization, the information suppressing system may determine that if the prior commercial offer, e.g., a meal discount offer associated with the second entity, e.g., a restaurant, has been utilized recently within a time specified by the preferences of the prior utilization, e.g., 2 hours, the first piece of information, e.g., a meal offer associated with the first entity, e.g., a similar restaurant as that of the second entity, is considered currently superfluous, since it is assumed that the vehicle occupant is not interested in eating again within such a short period of time.

According to one embodiment, the determining of status data, the determining of the at least first piece of information to be currently superfluous, and/or the suppressing the at least first piece of information, may at least partly be accomplished by means of one or more applications running on a mobile user device associated with the vehicle. Thereby, functionality providing at least part of the inventive concept may be provided by means of a mobile user device, as a complement to, or instead of, being provided by means of an in-vehicle system. The mobile user device being "associated with the vehicle" may be represented by a mobile user device carried on-board the vehicle; additionally or alternatively, the mobile user device may be a nomadic device, i.e., a mobile user device paired with the vehicle.

According to another embodiment, the information suppressing system may further determine a current position, determine the at least first entity to be in the current vicinity, and/or determine the at least first piece of information. Thereby, the information suppressing system is involved in establishing entities located relatively close to the vehicle, and/or establishing applicable presentable information related to said entities. The "position" is intended to refer to a position of the information suppressing system, for instance the vehicle, or alternatively, a mobile user device on-board the vehicle or a nomadic device paired with the vehicle. The position may, for instance, be based on GPS based coordinates. Learning of the position may be accomplished through commonly known means, and furthermore be fetched at a current instant in time; additionally and/or alternatively, a stored position value may be fetched, e.g., from a remote database holding dynamic position values, such as an intermediate system adapted to communicate with vehicles and to hold updated positions of the vehicles, for instance a management and/or assisting system such as e.g., Volvo On Call.

It should be appreciated that the introduced methods in the information suppressing system may require the vehicle and/or mobile user device to be in a respective "ON" state.

According to a second aspect of embodiments herein, the object is achieved by an information suppressing system adapted for avoiding distracting an occupant of a vehicle with superfluous information via a medium associated with the vehicle. The medium is adapted to present at least a first piece of information associated with at least a first entity located in a current vicinity of the vehicle. The information suppressing system comprises a status data determining unit adapted for determining status data. The status data comprises one or more status data parameters reflecting current conditions. The information suppressing system furthermore comprises a comparing unit adapted for determining the at least first piece of information to be currently superfluous, based on comparing at least a first status data parameter of the status data with predetermined suppression criteria. Moreover, the information suppressing system comprises a suppressing unit adapted for suppressing the at least first piece of information, wherein at least a portion of the at least first piece of information is prevented from being presented via the medium.

According to an embodiment, the status data may comprise one or more status data parameters reflecting current status conditions associated with the vehicle.

According to another embodiment, the at least first piece of information may comprise a current commercial offer associated with the first entity.

According to a further embodiment, the status data may comprise one or more status data parameters reflecting a prior utilization by the information suppressing system, of a prior commercial offer associated with the first entity and/or a second entity associated with the first entity.

According to one embodiment, the information suppressing system may further comprise a mobile user device associated with the vehicle. The mobile user device is adapted for, by means of one or more applications running thereon, at least partly accomplish the determining of status data, the determining of the at least first piece of information to be currently superfluous, and/or the suppressing of the at least first piece of information.

According to another embodiment, the information suppressing system may further comprise a position determining unit adapted for determining a current position, a vicinity determining unit adapted for determining the at least first entity to be in a current vicinity, and/or an information determining unit adapted for determining the at least first piece of information.

Similar advantages as those mentioned in the foregoing in relation to the first aspect correspondingly apply to the second aspect, why these advantages are not further discussed.

According to a third aspect of embodiments herein, the object is achieved by a vehicle comprising a status data determining unit, a comparing unit, and/or a suppressing unit of an information suppressing system as discussed above. Once again, similar advantages as those mentioned in the foregoing in relation to the first aspect correspondingly apply to the third aspect, why these advantages are not further discussed.

According to a fourth aspect of embodiments herein, the object is achieved by a mobile user device comprising a status data determining unit, a comparing unit, and/or a suppressing unit of an information suppressing system as discussed above. Once more, similar advantages as those mentioned in the foregoing in relation to the first aspect correspondingly apply to the fourth aspect, why these advantages are not further discussed.

According to a fifth aspect of embodiments herein, the object is achieved by a computer program product comprising a computer program containing computer program code means arranged to cause a computer or a processor to execute the steps the information suppressing system discussed in the foregoing, stored on a computer-readable medium or a carrier wave. Yet again, similar advantages as those mentioned in the foregoing in relation to the first aspect correspondingly apply to the fifth aspect, why these advantages are not further discussed.

BRIEF DESCRIPTION OF THE DRAWINGS

The various aspects of non-limiting embodiments, including particular features and advantages, will be readily understood from the following detailed description and the accompanying drawings, in which.

DETAILED DESCRIPTION

Figure 1:
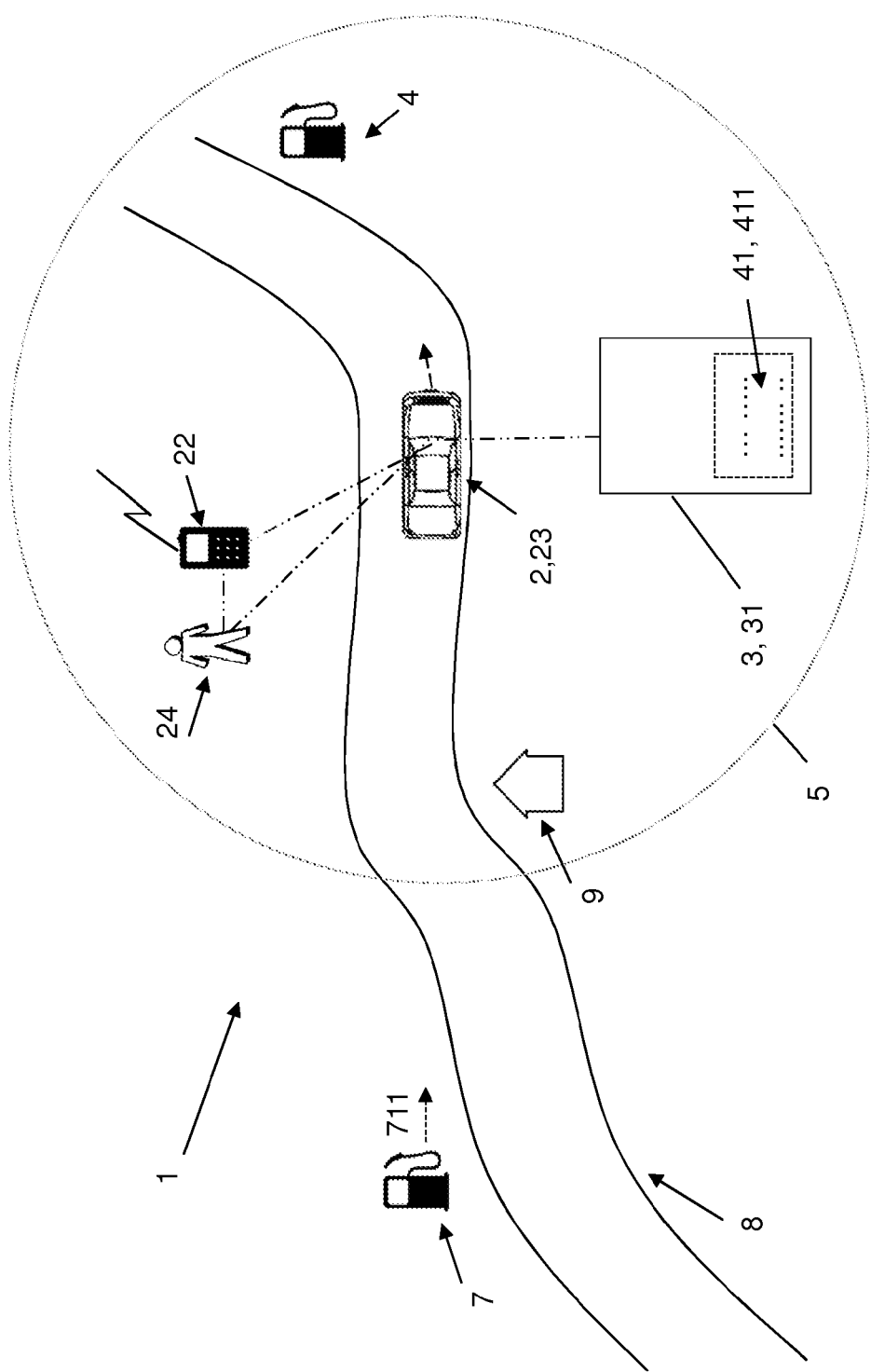
FIG. 1 illustrates a schematic overview of an exemplifying information suppressing system comprised in a vehicle and/or in a mobile user device, according to embodiments of the disclosure.

The non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to avoiding distracting an occupant of a vehicle with superfluous information via a medium associated with the vehicle, there will be disclosed that information considered currently superfluous, is discarded, such that said information does not unnecessarily distract the vehicle occupant.

Referring now to the figures and FIG. 1 in particular, there is depicted a schematic overview of an exemplifying information suppressing system 1 comprised in a vehicle 2 and/or comprised a mobile user device 22, according to embodiments of the disclosure.

The mobile user device 22, which e.g., may be represented by a smart phone, is here associated with the vehicle 2 by being paired therewith, whereby it is referred to as a nomadic device. The illustrated vehicle 2, although not restricted thereto, is in the shown embodiment a car, driving along an exemplifying arbitrary road 8. The information suppressing system 1, and hence the vehicle 2 and mobile user device 22, are currently located at a current position 23.

The information suppressing system 1, which will be additionally described in further detail below, is adapted for avoiding distracting an occupant 24 of the vehicle 2, here a vehicle driver, with superfluous information via a medium 3 associated with the vehicle 2. The medium 3, here a display 31 of the vehicle 2, is adapted to present at least a first piece of information 41 associated with at least a first entity 4 located in a current vicinity 5 of the vehicle 2. In the shown embodiment, the at least first piece of information 41 comprises a current commercial offer 411 associated with the first entity 4. The first entity 4 is, in the illustrated example, a fuel station, and the current commercial offer 411 is represented by a current fuel discount offer provided by the fuel station 4.

Also depicted in FIG. 1 is an exemplifying second entity 7 associated with the first entity 4. The association is here represented by the second entity 7, similarly to the first entity, being a fuel station. The second entity 7 is associated with a prior commercial offer 711, e.g., represented by a previous fuel discount offer.

Furthermore, an exemplifying third entity 9 is depicted, which third entity 9 may be represented by any arbitrary entity, such as for instance a restaurant.

Figure 2:
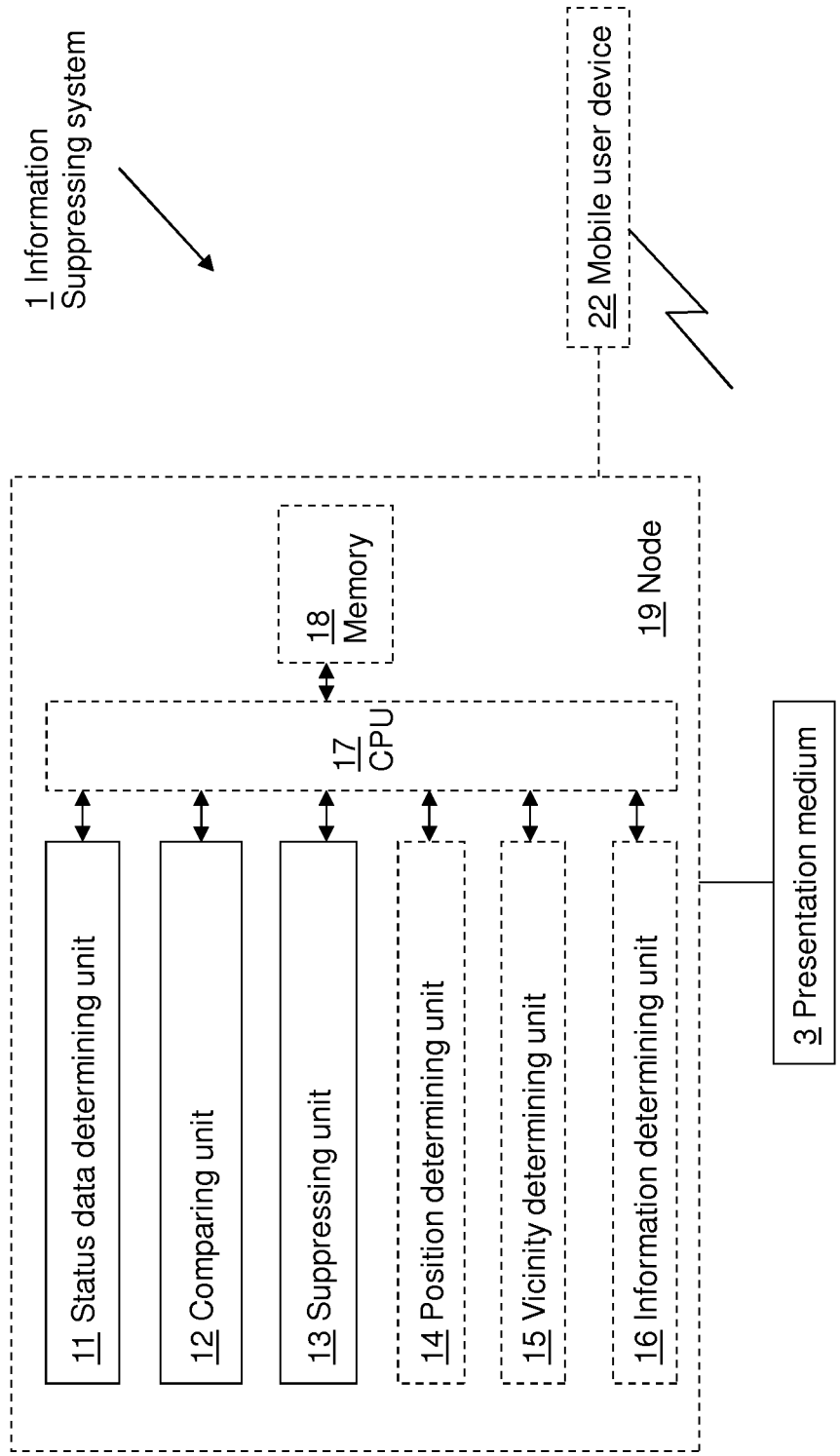
FIG. 2 is a schematic block diagram illustrating an exemplifying information suppressing system according to embodiments of the disclosure.

As further shown in FIG. 2, which depicts a schematic block diagram illustrating an exemplifying information suppressing system 1 according to embodiments of the disclosure, the information suppressing system 1 is, as previously mentioned, adapted for avoiding distracting the occupant 24 of the vehicle 2 with superfluous information via the medium 3 associated with the vehicle 2, which medium 3 is adapted to present the at least first piece of information 41 associated with the at least first entity 4 located in the current vicinity 5 of the vehicle 2.

The information suppressing system 1 comprises a status data determining unit 11, a comparing unit 12, and a suppressing unit 13, all of which will be described in further detail below. Moreover, the information suppressing system 1 may comprise a position determining unit 14 adapted for determining the current position 23, a vicinity determining unit 15 adapted for determining the at least first entity 4 to be in the current vicinity 5, and an information determining unit 16 adapted for determining the at least first piece of information 41.

Furthermore, the embodiments herein for avoiding distracting the occupant 24 of the vehicle 2 with superfluous information, may be implemented through one or more processors, such as a processor 17, here denoted CPU, together with computer program code for performing the functions and actions of the embodiments herein. Said program code may also be provided as a computer program product, for instance in the form of a data carrier carrying computer program code for performing the embodiments herein when being loaded into the information suppressing system 1. One such carrier may be in the form of a CD ROM disc. It is however feasible with other data carriers such as a memory stick. The computer program code may furthermore be provided as pure program code on a server and downloaded to the information suppressing system 1.

The information suppressing system 1 may further comprise a memory 18 comprising one or more memory units. The memory 18 may be arranged to be used to store e.g., information, and further to store data, configurations, schedulings, and applications, and for instance parameters, to perform the methods herein when being executed in the information suppressing system 1. Furthermore, the status data determining unit 11, the comparing unit 12, the suppressing unit 13, the optional position determining unit 14, the optional vicinity determining unit 15, and the optional information determining unit 16 described above, which will be described in more detail later on in this description, and/or the option processor 17 and the optional memory 18, may for instance be implemented in one or several arbitrary nodes 19 arranged locally on-board the vehicle 2 or remotely therefrom such as in one or more databases which may support e.g., cloud functionality, and/or in the mobile user device 22. The node 19 may be an electronic control unit (ECU) or any suitable generic electronic device, and may involve, for instance, an infotainment node or a main central node.

Those skilled in the art will also appreciate that the status determining unit 11, the comparing unit 12, the suppressing unit 13, the optional position determining unit 14, the optional vicinity determining unit 15, and the optional information determining unit 16, may refer to a combination of analog and digital circuits, and/or one or more processors configured with software and/or firmware, e.g., stored in a memory such as the memory 18, that when executed by the one or more processors such as the processor 17 perform as will be described in more detail below. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 3:
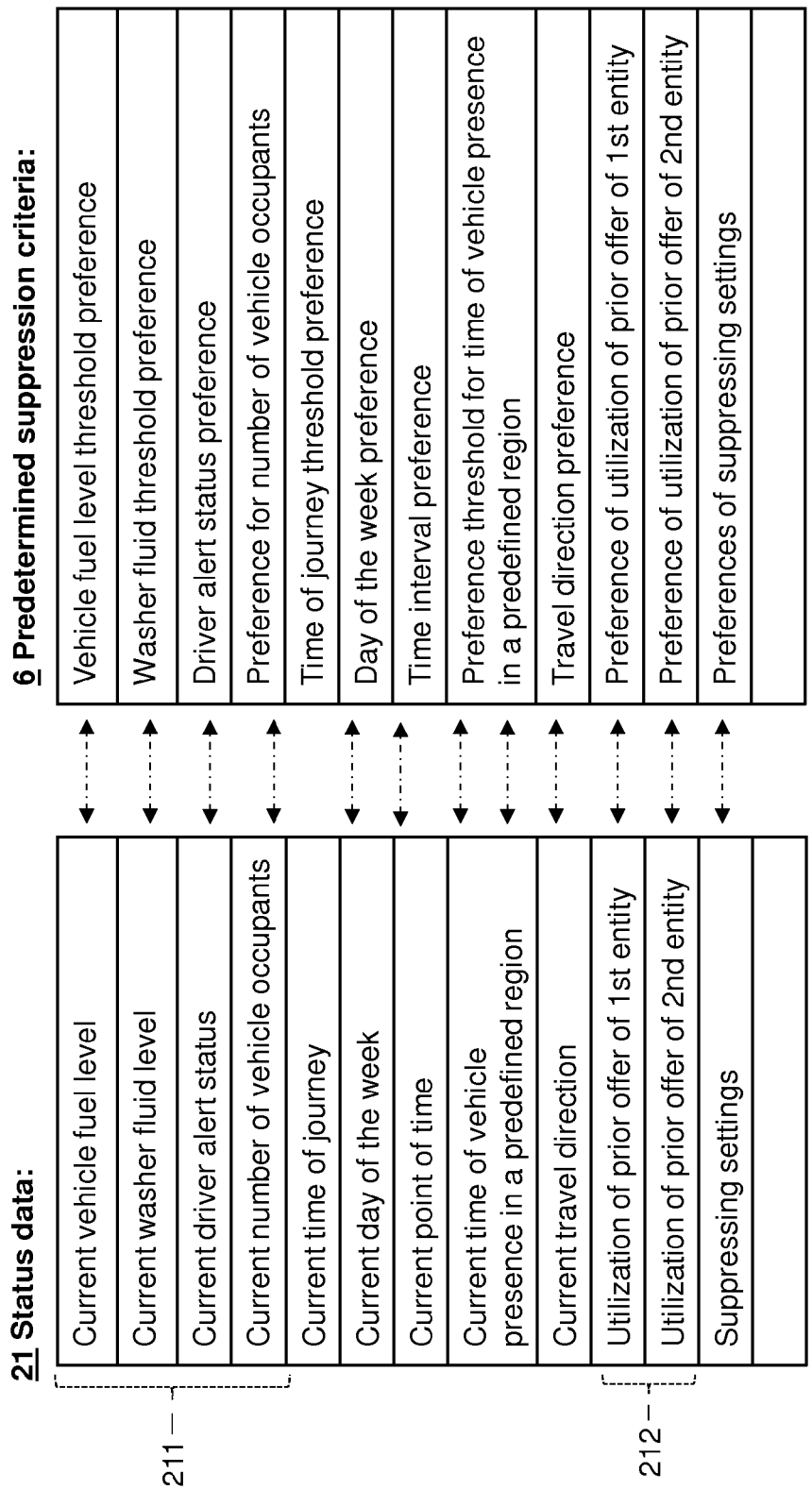
FIG. 3 illustrates exemplifying status data and exemplifying predetermined suppression criteria, according to embodiments of the disclosure.

FIG. 3 illustrates exemplifying status data 21 and exemplifying predetermined suppression criteria 6, according to embodiments of the disclosure. The status data 21 comprises one or more status data parameters reflecting current conditions. The status data 21 is adapted to be compared with the predetermined suppression criteria 6.

Figure 4:
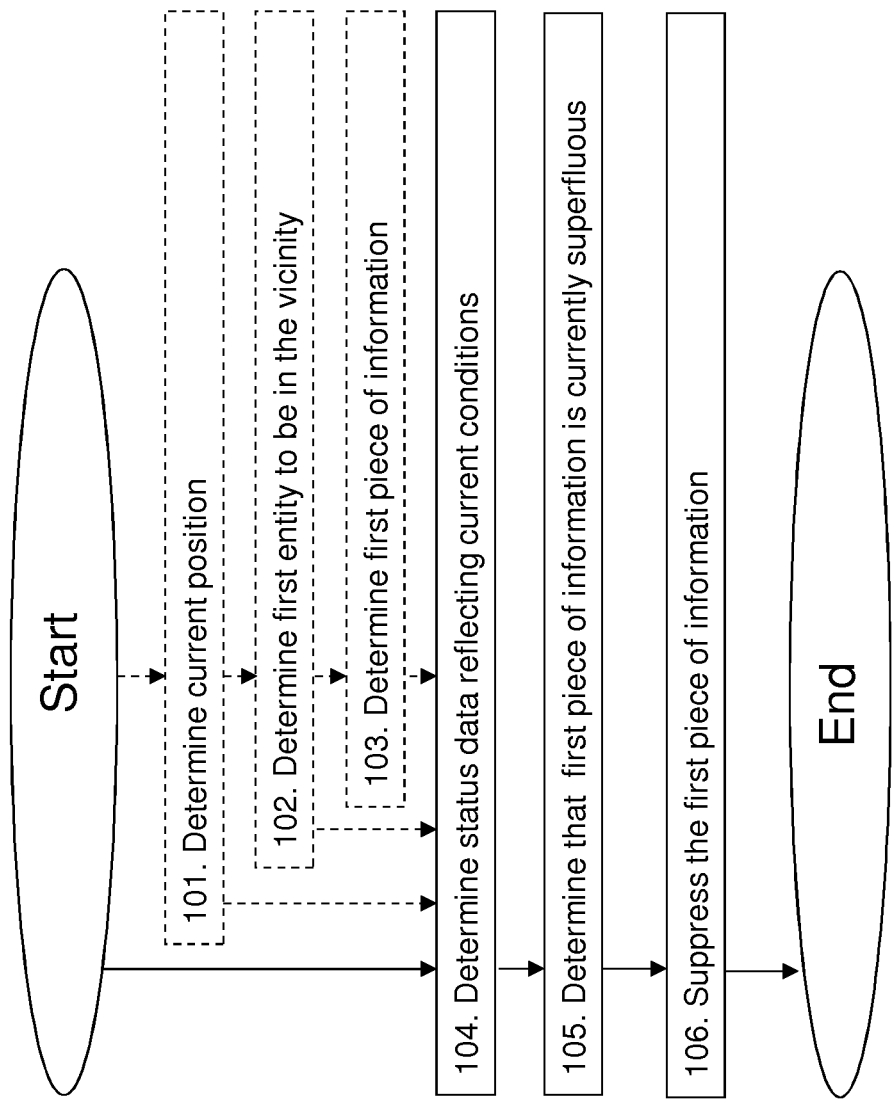
FIG. 4 is a flowchart depicting an exemplifying method performed by an information suppressing system according to embodiments of the disclosure.

FIG. 4 is a flowchart depicting an exemplifying method performed by an information suppressing system 1 according to embodiments of the disclosure. The method in the information suppressing system 1 is for avoiding distracting the occupant 24 of the vehicle 2 with superfluous information via the medium 3 associated with the vehicle 2, which medium 3 is adapted to present the at least first piece of information 41 associated with the at least first entity 4 located in the current vicinity 5 of the vehicle 2. The exemplifying method, which may be continuously repeated, comprises the following actions discussed with support from FIGS. 1-3. The actions may be taken in any suitable order, and/or one or more actions may even be performed simultaneously where applicable.

Action 101

In optional Action 101, the information suppressing system may, e.g., by means of the position determining unit 14, determine the current position 23.

Action 102

In optional Action 102, the information suppressing system may, e.g., by means of the vicinity determining unit 15, determine the at least first entity 4 to be in the current vicinity 5.

Action 103

In optional Action 103, the information suppressing system 1 may, e.g., by means of the information determining unit 16, determine the at least first piece of information 41.

Action 104

In Action 104, the information suppressing system 1 determines, e.g., by means of the status data determining unit 11, the status data 21. The status data 21 comprises one or more status data parameters reflecting current conditions.

Correspondingly, the status data determining unit 11 is adapted for determining the status data 21, which status data comprises one or more status data parameters reflecting the current conditions.

Exemplifying status data parameters are provided on the left hand side of FIG. 3.

Optionally, the status data 21 may comprise one or more status data parameters 211 reflecting current status conditions associated with the vehicle 2.

Moreover, optionally, the first piece of information 41 may comprise the current commercial offer 411 associated with the first entity 4.

Furthermore, the status data 21 may comprise one or more status data parameters 212 reflecting a prior utilization by the information suppressing system 1, of the prior commercial offer 711 associated with the first entity 4 and/or the second entity 7 associated with the first entity 4.

Please note that Action 104 may be performed prior to, or simultaneously with, any or all of optional Actions 101-103.

Action 105

In Action 105, the information suppressing system 1 determines, e.g., by means of the comparing unit 12, the at least first piece of information 41 to be currently superfluous, based on comparing the at least first status data parameter of the status data 21 with the predetermined suppression criteria 6.

Correspondingly, the comparing unit 12 is adapted for determining that the at least first piece of information 41 is currently superfluous, based on comparing at least a first status data parameter of the status data 21 with the predetermined suppression criteria 6.

Exemplifying suppression parameters of the predetermined suppression criteria are provided on the right hand side of FIG. 3.

Action 106

In Action 106, the information suppressing system 1 suppresses, e.g., by means of the suppressing unit 13, the at least first piece of information 41, wherein at least a portion of the at least first piece of information 41 is prevented from being presented via the medium 3.

Correspondingly, the suppressing unit 13 is adapted for suppressing the at least first piece of information 41, wherein at least a portion of the at least first piece of information 41 is prevented from being presented via the medium 3.

Action 104 of determining the status data 21, Action 105 of determining the at least first piece of information 41 to be currently superfluous, and/or Action 106 of suppressing the at least first piece of information 41, may at least partly be accomplished by means of one or more applications running on the mobile user device 22 associated with the vehicle 2.

Correspondingly, the mobile user device 22 associated with the vehicle 2, may be adapted for, by means of one or more applications running thereon, at least partly accomplish the Action 104 of determining the status data 21, Action 105 of determining the at least first piece of information 41 to be currently superfluous, and/or Action 106 of suppressing the at least first piece of information 41.

Consequently, according to the introduced concept as described in the foregoing, there is provided an approach according to which distracting an occupant 24 of a vehicle 2 with superfluous information is avoided, in that should it be determined that the at least first piece of information 41, for instance an advertising offer, is to be suppressed, the information suppression system 1 may cancel the at least first piece of information 41 from being presented on the e.g., display 3, 31, and/or remove the at least first piece of information 41 from the e.g., display 3, 31.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

While exemplary embodiments are described above, it is not intended that these embodiments describe all possible forms. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A method performed by an information suppressing system for avoiding distracting an occupant of a vehicle with superfluous information via a medium associated with the vehicle, the medium being configured to present at least a first piece of information associated with at least a first entity located in a current vicinity of the vehicle, the method comprising:
   determining status data comprising one or more status data parameters reflecting current conditions, wherein the one or more status data parameters reflect a current driver alert status, a current number of vehicle occupants and/or a current timing condition;
   determining whether the at least first piece of information is currently superfluous, based on comparing at least a first status data parameter of the status data with at least one predetermined suppression criterion; and
   suppressing the at least first piece of information if the at least first piece of information is determined to be superfluous, such that at least a portion of the at least first piece of information is prevented from being presented via the medium.

2. The method according to claim 1 wherein the status data comprises one or more status data parameters reflecting current status conditions associated with the vehicle.

3. The method according to claim 1 wherein the at least first piece of information comprises a current commercial offer associated with the first entity.

4. The method according to claim 3 wherein the status data comprises one or more status data parameters reflecting a prior utilization by the information suppressing system of a prior commercial offer associated with the first entity and/or a second entity associated with the first entity.

5. The method according to claim 1 wherein the determining status data, the determining whether the at least first piece of information is currently superfluous, and/or the suppressing the at least first piece of information are/is at least partly accomplished by means of one or more applications running on a mobile user device associated with the vehicle.

6. The method according to claim 1 further comprising:
   determining a current position of the information suppressing system;
   determining the at least first entity to be in the current vicinity; and/or
   determining the at least first piece of information.

7. An information suppressing system for avoiding distracting an occupant of a vehicle with superfluous information via a medium associated with the vehicle, the medium being configured to present at least a first piece of information associated with at least a first entity located in a current vicinity of the vehicle, the information suppressing system comprising:
   a status data determining unit configured to determine status data, the status data comprising one or more status data parameters reflecting current conditions, wherein the one or more status data parameters reflect a current driver alert status, a current number of vehicle occupants and/or a current timing condition;
   a comparing unit configured to determine whether the at least first piece of information is currently superfluous, based on comparing at least a first status data parameter of the status data with at least one predetermined suppression criterion; and
   a suppressing unit configured to suppress the at least first piece of information if the at least first piece of information is determined to be superfluous, such that at least a portion of the at least first piece of information is prevented from being presented via the medium.

8. The information suppressing system according to claim 7 wherein the status data comprises one or more status data parameters reflecting current status conditions associated with the vehicle.

9. The information suppressing system according to claim 7 wherein the at least first piece of information comprises a current commercial offer associated with the first entity.

10. The information suppressing system according to claim 9 wherein the status data comprises one or more status data parameters reflecting a prior utilization by the information suppressing system of a prior commercial offer associated with the first entity and/or a second entity associated with the first entity.

11. The information suppressing system according to claim 7 further comprising:
   a mobile user device associated with the vehicle, the mobile user device being configured to, by means of one or more applications, at least partly determine the status data, determine whether the at least first piece of information is currently superfluous, and/or suppress the at least first piece of information.

12. The information suppressing system according to claim 7 further comprising:
   a position determining unit configured to determine a current position of the information suppressing system;
   a vicinity determining unit configured to determine whether the at least first entity is in the current vicinity; and/or
   an information determining unit configured to determine the at least first piece of information.

13. A vehicle comprising the information suppressing system according to claim 7.

14. A mobile user device comprising the information suppressing system according to claim 7.

15. A computer program product comprising a computer program including computer program code stored on a non-transitory computer-readable medium for execution by a computer or a processor to carry out a method for avoiding distracting an occupant of a vehicle with superfluous information via a medium associated with the vehicle, the medium being configured to present at least a first piece of information associated with at least a first entity located in a current vicinity of the vehicle, wherein the computer program code is configured for execution by the computer or the processor to:
- determine status data comprising one or more status data parameters reflecting current conditions, wherein the one or more status data parameters reflect a current driver alert status, a current number of vehicle occupants and/or a current timing condition;
- determine whether the at least first piece of information is currently superfluous, based on comparing at least a first status data parameter of the status data with at least one predetermined suppression criterion; and
- suppress the at least first piece of information if the at least first piece of information is determined to be superfluous, such that at least a portion of the at least first piece of information is prevented from being presented via the medium.

16. The method according to claim 1 wherein the status data comprises one or more status data parameters reflecting a prior utilization by the information suppressing system of a prior commercial offer associated with the first entity and/or a second entity associated with the first entity.

17. The method according to claim 3 wherein the determining status data, the determining whether the at least first piece of information is currently superfluous, and/or the suppressing the at least first piece of information are/is at least partly accomplished by means of one or more applications running on a mobile user device associated with the vehicle.

18. The method according to claim 3 further comprising:
- determining a current position of the information suppressing system;
- determining the at least first entity to be in the current vicinity; and/or
- determining the at least first piece of information.

19. The information suppressing system according to claim 7 wherein the status data comprises one or more status data parameters reflecting a prior utilization by the information suppressing system of a prior commercial offer associated with the first entity and/or a second entity associated with the first entity.

20. The information suppressing system according to claim 10 further comprising:
- a mobile user device associated with the vehicle, the mobile user device being configured to, by means of one or more applications running thereon, at least partly determine the status data, determine whether the at least first piece of information is currently superfluous, and/or suppress the at least first piece of information.

* * * * *